Feb. 25, 1969     J. F. HINRICHS     3,430,029
RAPID LOAD SYSTEM FOR ELECTRON BEAM WELDER
Filed Jan. 6, 1967
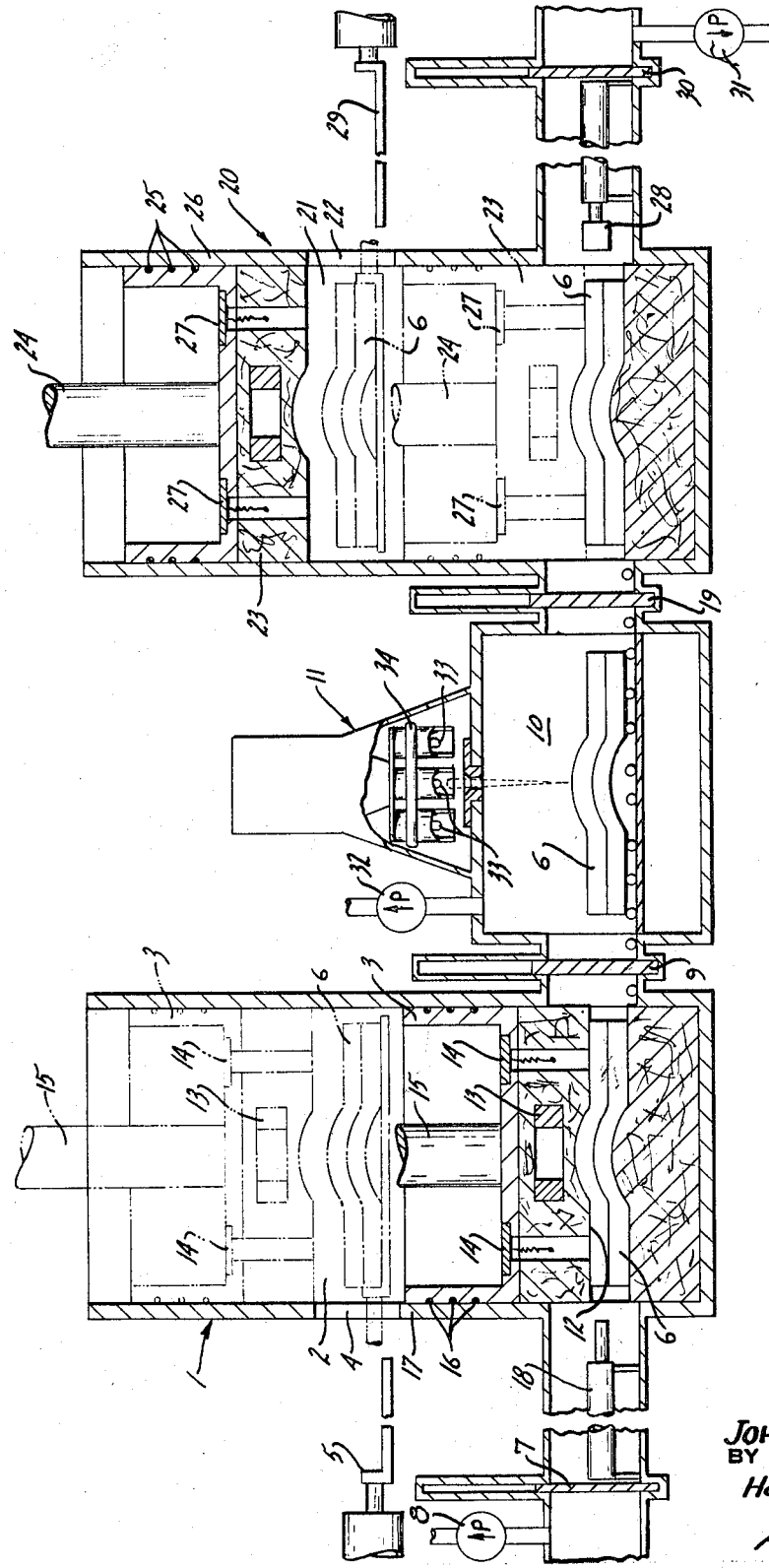
INVENTOR
JOHN F. HINRICHS
BY
Howard J. Barnett
Attorney United States Patent Office 3,430,029
Patented Feb. 25, 1969

3,430,029
RAPID LOAD SYSTEM FOR ELECTRON BEAM WELDER
John F. Hinrichs, Menomonee Falls, Wis., assignor to A. O. Smith Corporation, Milwaukee, Wis., a corporation of New York
Filed Jan. 6, 1967, Ser. No. 607,777
U.S. Cl. 219—121       10 Claims
Int. Cl. B23k 35/38, 15/00, 9/16

ABSTRACT OF THE DISCLOSURE

A rapid cycling load-unload system for automated electron beam welding is disclosed. The system includes a loading cylinder, electron beam welding chamber, and unloading cylinder in alignment with valve means interconnecting the welding chamber with the respective loading and unloading cylinders. Both of the loading and unloading cylinders have an atmospheric access and exit opening respectively and a reciprocating position disposed therein which provides closure means for the respective openings. During operation of the system, both loading and unloading cylinders are evacuated when the openings are closed such that a workpiece is transferred into the welding chamber from the loading cylinder while a welded workpiece is simultaneously being transferred out of the welding chamber into the unloading chamber under vacuum conditions.

Background of the invention

The invention provides a high-speed means for pass-through production line electron beam welding of metal workpieces. The large piston-compression chamber loading technique of the invention provides a rapid means for equalizing the vacuum conditions in the preload, welding and unload chambers to facilitate high-speed welding of mass produced parts by the vacuum chamber electron beam welding technique.

Electron beam welding has not previously been considered for high-rate production line welding because of the evacuated environment required to effect welding with reasonably consistent quality. Some attempts have been made to weld under atmospheric conditions, but with only moderate success because of high voltage requirements in the range of 150 to 200 kv., and because the porosity caused in the weld metal by the presence of $N_2$, $O_2$ and $CO_2$. Also, beam power losses due to ionization of atmospheric gases and close gun-to-work distance, that is $1/8''-5/8''$, impose serious limitations on full use of this process.

To weld in a vacuum chamber and then reload such a chamber with a new workpiece using conventional apparatus takes considerable time due to the manual operations required in loading and unloading and due to the large volume of the conventional chamber which must be completely evacuated every time the chamber is reloaded. When a relatively large workpiece is to be welded, the pumpdown time for a conventional welding chamber is such a serious problem that the process has not generally been considered for this type of welding prior to applicant's invention.

Applicant overcomes the pumpdown problem by providing a piston-cylinder preload chamber which rapidly decreases in its internal dimensions during loading of each workpiece. In addition, the volume of the preload chamber, and proportionally, the required pumpdown time prior to loading the work into the welding chamber is further decreased by providing contoured plastic, concrete or other similar type filler walls in the preload chamber surrounding the workpiece.

Summary of the invention

This invention provides a rapid cycling load-unload system for automated electron beam welding mass produced metal articles. The apparatus incorporates a plurality of large press piston displacer devices to greatly accelerate the pumpdown time between atmosphere loading and unloading and thereby substantially speed up the possible production rate attainable with this automatic welding apparatus.

The system includes a pair of large pistons for rapidly evacuating the preload and unloading chambers so that the workpiece can be loaded into and out of the welding chamber under vacuum welding conditions. The large surface displacement area of the pistons compressing into the preload and unload chamber cylinders greatly facilitates the speed at which the preload and unload chambers can be evacuated. The workpiece to be welded is received through a loading opening in the preload chamber cylinder and is then disposed on the inner surface of the retracted closure piston. The preload chamber piston is then moved into the preload chamber cylinder while vacuum pumps are actuated to pump down both the preload and the unload chamber. Valves in the piston open to permit escape of air displaced by the descending piston.

The compressing action of the large piston area substantially increases the pumpdown rate, and as the piston stops at the inner end of its stroke, it reverses direction, the piston valves close and the piston pulls a vacuum on the preload chamber. Vacuum pumps supplement the piston action to pull the preload chamber down to the same vacuum as the welding chamber. The inner piston surface and the opposing cylinder surface are both contoured to generally conform to the shape of the workpiece and thereby provide a minimum closed preload chamber volume to evacuate. After the preload chamber is pumped down to the same vacuum as the adjacent welding chamber, a gate valve opens between the two chambers and the workpiece is pushed into the welding chamber into position for welding. A similar piston unload chamber can be provided to remove completed workpieces from the apparatus.

It is contemplated that the whole cycle can be accomplished in about 15–20 seconds with the apparatus of the invention, including the steps of loading the part into the preload chamber, cylinder compression stroke to bring the preload chamber down to the welding chamber vacuum, transfer of the workpiece into the welding chamber, welding, unloading of the workpiece into the unload chamber, and unloading the completed part from the unload chamber. The loading, welding and unloading can, of course, be synchronized so that every time a new workpiece is loaded, a second workpiece is being welded and a third completed workpiece is being unloaded.

Brief description of the drawings

The drawings illustrate the presently preferred method of carrying out the invention.

The sole figure of the drawing shows schematically the apparatus of the invention at the instant of welding.

Description of the preferred embodiment

As seen in the drawing, a preload cylinder 1 which includes a loading chamber 2 and a piston 3, is provided with a load opening 4. A loading mechanism 5 is provided to move a workpiece 6 into the chamber 2. The lower part of the preload cylinder 1 is provided with a first gate valve 7 connected to a suitable vacuum pump 8. A second gate valve 9 is shown interconnecting the loading chamber 2 with a vacuum welding chamber 10 of an electron beam welding gun 11. The piston 3 is shown with a contoured surface 12 adapted to fit closely around the workpiece 6 which is held against the piston surface 12 by a magnet 13 embedded in the piston 3. Mechanical fingers or other workpiece moving means can also be used instead of the magnet 13. A pair of one-way relief valves 14 are provided in the body of the piston 3 to open as the piston 3 is moved by means of piston rod 15 into the preload cylinder chamber 2, thereby rapidly decreasing the volume of the chamber 2. Sliding seals 16 are shown on the outer periphery of the piston 3, sealing the sliding surface between the piston 3 and wall 17 of the chamber 2. A push-type transfer apparatus 18 is provided to move the workpiece 6 from the loading chamber 2 into the welding chamber 10.

The drawing shows the piston 3 in the closed position with the workpiece 6 disposed thereon and ready to be loaded into the welding chamber 10 when the gate valve 8 is opened. The piston 3 is retracted slightly to faciltate loading of the workpiece 6 in the welding chamber 10. The piston 3 is also shown in phantom in the upstroke position ready to receive a workpiece 6 (also shown in phantom).

The workpiece 6 being welded is shown in position in the welding chamber 10. A third gate valve 19 interconnects the welding chamber 10 with an unload cylinder 20 which includes a chamber 21 and an unload opening 22. An unload piston 23 is disposed in the chamber 21 and is actuated by means of a piston rod 24. Seals 25 are provided between the piston 23 and wall 26 of the chamber 21, and one-way relief valves 27 (similar to the valves 14) are disposed in the body of the piston 23. The piston 23 is shown in the unloading position, with a welded workpiece 6 being passed out the unload opening 22. The piston 23 is also shown in phantom in the workpiece receiving position ready to receive a welded workpiece 6 from the welding chamber 10. A retractor rod 28 is provided to move the workpiece 6 from the welding chamber 9 through the gate valve 19, into the unload chamber 21. An unloader assembly 29 is also included, and is disposed outside the unload opening 22 to remove the welded workpiece 6 from the unload chamber 21. A fourth gate valve 30 is provided and is connected to a suitable vacuum pump 31 to pumpdown the unload chamber 21 to the vacuum level of welding chamber 10. Welding chamber 9 is also provided with a suitable vacuum pump 32 to maintain the required vacuum therein at all times.

The operating cycle of the apparatus is continuous and rapid. The welding cycle is automated and can be continued indefinitely, as long as workpieces are supplied. A welding rate of about 180–240 workpieces per hour is not unusual with this apparatus when a ratio of one electron beam gun per foot of weld is used. It is contemplated that exhausted tungsten filaments 32 will be replaced conveniently by means of a rotatable cube assembly 33 having a plurality of filaments 32 mounted thereon. When the active filament 32 is exhausted, it is only necessary to rotate the cube assembly 33 to align a fresh filament 32 in the electron beam welding gun 11 and place it in the welding circuit. This motion can be accomplished either by a mechanical indexing system, an electrical synchro-servo system or a combination, and is readily apparent to those skilled in the art.

The loading system of the invention is efficient because the several sequential steps of the process are sandwiched together and happen simultaneously. For example, while welding is underway in the evacuated welding chamber 10, the gate valves 9 and 19 are closed and a new workpiece 6 is loaded through opening 4 onto the piston 3, which then moves down into the chamber 2, displacing the trapped air which escapes through the one-way relief valves 14. The piston 3 reaches the bottom of the stroke and then is retracted slightly, closing valves 14 and pulling a vacuum on the preload chamber 2. At this time, the gate valve 7 opens and completes the pumpdown of the chamber 2 to the same vacuum condition as the welding chamber 10. The valve 9 is then opened upon completion of welding to transfer the unwelded workpiece 6 into the welding chamber 10 as the welded workpiece 6 is removed through the open gate valve 19 into the unload chamber 21, which is also under vacuum at this time.

As the piston 23 in the unloader chamber 21 is transferring a welded workpiece 6 out to atmospheric pressure, the preload chamber 2 receives another unwelded workpiece 6 from atmospheric pressure through the opening 4, and the piston 3 again moves down into the chamber 2 repeating the loading cycle as described above. As soon as the welded workpiece 6 is discharged from the unload opening 22, the piston 23 is moved down into chamber 21 displacing air through one-way relief valves 27 and reestablishing a vacuum in the chamber 21 in a manner similar to the operation of the piston 3 in the preload chamber 2.

As welding is completed, both piston 3 and piston 23 are at their downstroke positions. The gate valves 9 and 19 are then opened and the welded workpiece 6 is transferred out into the unload chamber 21 and an unwelded workpiece 6 is transferred into the welding chamber 10 from the preload chamber 2. The gate valves 9 and 19 are then closed, and the cycle is repeated.

Various modes of carrying out the invention are contemplated as being within the scope of the following claims particularly pointing out and distinctly claiming the subject matter which is regarded as the invention.

I claim:

1. A rapid cycling load-unload system for automated electron beam welding apparatus comprising a loading cylinder having an atmospheric access opening, a piston disposed in said cylinder providing closure means for said access opening, vacuum pumping means for evacuating said loading cylinder when said access opening is closed, an electron beam welding chamber adjacent said loading cylinder, valve means connecting said loading cylinder with said electron beam welding chamber to provide controlled access between said loading cylinder and said electron beam welding chamber, means for maintaining said welding chamber at vacuum conditions for welding, an unload cylinder disposed adjacent said welding chamber, valve means interconnecting said welding chamber with said unloading cylinder, said unload cylinder having an atmospheric exit opening, a piston disposed in said unloading cylinder providing closure means for said exit opening, and means for evacuating said unloading cylinder when said exit opening is closed whereby a workpiece can be transferred into the welding chamber from said preload cylinder while a welded workpiece is simultaneously being transferred out of the welding chamber into the unloading cylinder under vacuum conditions.

2. The apparatus of claim 1 in which the pistons include one-way relief valves and are adapted to reciprocate a distance sufficient to accelerate the evacuation time in their respective cylinder chambers.

3. The apparatus of claim 1, in which the pistons are provided with means to grip and hold a workpiece thereon to transfer said workpiece between atmospheric and vacuum pressure.

4. The apparatus of claim 1, in which pistons include means to grip and hold a workpiece while transferring said workpiece between atmospheric and vacuum pressure, and in which the inner surfaces of said pistons are contoured to provide minimum volume chambers to facilitate changing between atmospheric and vacuum pressures.

5. A pass-through assembly line electron beam welding apparatus comprising an electron beam welding apparatus having a sealable inlet port and a sealable outlet port, a load cylinder disposed in communication with said inlet port, a reciprocating piston member disposed in said load cylinder, an opening in said load cylinder communicating with the surrounding atmosphere, an unload cylinder disposed in communication with said outlet port, a reciprocating piston member disposed in said unload cylinder, an opening in said unload cylinder communicating with the atmosphere, transfer means for sequentially moving a workpiece from the surrounding atmosphere into the load cylinder, the electron beam welding apparatus, the unload cylinder and into the atmosphere, and means for actuating said reciprocating pistons in synchronism with the opening and closing of said sealable inlet and outlet ports to facilitate maintenance of optimum welding conditions in said electron beam welding apparatus.

6. The apparatus of claim 5, in which the electron beam welding apparatus includes a rotatable member having a plurality of electron emitting means supported thereon to provide a rapid replacement system for successive exhausted electron emitting means.

7. The apparatus of claim 5, in which said pistons include one-way valves to facilitate displacing entrapped air as the pistons move down into their respective cylinders sealing the respective openings to the atmosphere, whereby the time for transfer of a workpiece between atmospheric pressure and vacuum welding pressure is accelerated.

8. The apparatus of claim 5, in which the reciprocating piston member in said load cylinder is contoured to generally conform to the shape of the workpiece, thereby defining a minimum volume chamber to be evacuated.

9. The apparatus of claim 8, in which the reciprocating piston member in said unload cylinder is also contoured to generally conform to the shape of the workpiece to define a minimum volume chamber to be evacuated.

10. The apparatus of claim 9, in which the surfaces of said load and unload cylinders opposing the contoured surfaces of said reciprocating piston members are also contoured to further limit the volume to be evacuated from the respective chambers.

References Cited

UNITED STATES PATENTS

| 2,816,231 | 12/1957 | Nygard | 219—121 |
| 3,020,389 | 2/1962 | Gorman | 219—121 |
| 3,206,336 | 9/1965 | Hora | 219—121 |
| 3,219,792 | 11/1965 | Pederson | 219—121 |
| 3,264,004 | 8/1966 | Sciaky | 219—121 |
| 3,301,993 | 1/1967 | Boyd et al. | 219—121 |
| 3,325,620 | 6/1967 | Hunt et al. | 219—121 |

RICHARD M. WOOD, *Primary Examiner.*

W. DEXTER BROOKS, *Assistant Examiner.*

U.S. Cl. X.R.

219—72